US009769910B2

(12) United States Patent
Aliakseyeu et al.

(10) Patent No.: US 9,769,910 B2
(45) Date of Patent: Sep. 19, 2017

(54) SYSTEM FOR SHARING AND/OR SYNCHRONIZING ATTRIBUTES OF EMITTED LIGHT AMONG LIGHTING SYSTEMS

(71) Applicant: PHILIPS LIGHTING HOLDING B.V., Eindhoven (NL)

(72) Inventors: Dzmitry Viktorovich Aliakseyeu, Eindhoven (NL); Bartel Marinus Van De Sluis, Eindhoven (NL); Philip Steven Newton, Waalre (NL); Ramon Antoine Wiro Clout, Eindhoven (NL); Tim Dekker, Eindhoven (NL); Tatiana Aleksandrovna Lashina, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/110,501

(22) PCT Filed: Jan. 4, 2015

(86) PCT No.: PCT/IB2015/050049
§ 371 (c)(1),
(2) Date: Jul. 8, 2016

(87) PCT Pub. No.: WO2015/104650
PCT Pub. Date: Jul. 16, 2015

(65) Prior Publication Data
US 2016/0338179 A1 Nov. 17, 2016

Related U.S. Application Data

(60) Provisional application No. 61/924,748, filed on Jan. 8, 2014.

(51) Int. Cl.
H05B 37/02 (2006.01)
H05B 33/08 (2006.01)
(Continued)

(52) U.S. Cl.
CPC ....... *H05B 37/0272* (2013.01); *H04L 12/282* (2013.01); *H04L 67/10* (2013.01);
(Continued)

(58) Field of Classification Search
CPC ............ H05B 37/0272; H05B 37/0218; H05B 37/0227; H05B 37/0245; H05B 33/0866;
(Continued)

(56) References Cited

U.S. PATENT DOCUMENTS

| 6,016,038 A | 1/2000 | Mueller et al. |
| 6,211,626 B1 | 4/2001 | Lys et al. |

(Continued)

FOREIGN PATENT DOCUMENTS

| WO | 2007029136 A1 | 3/2007 |
| WO | 2010079388 A1 | 7/2010 |

(Continued)

*Primary Examiner* — Vibol Tan
(74) *Attorney, Agent, or Firm* — Meenakshy Chakravorty

(57) ABSTRACT

System, methods, computer-readable media and apparatus are described herein for sharing lighting settings between lighting systems in real time. In some embodiments, a user may configure a local lighting system to "follow" a remote lighting system, such that the local lighting system emits light that resembles light emitted contemporaneously by the remote lighting system. Likewise, a user may cause one or more attributes of light emitted by a local lighting system to be published, so that other remote lighting systems may follow the local lighting system.

12 Claims, 5 Drawing Sheets

(51) Int. Cl.
*H04L 29/08* (2006.01)
*H04L 12/28* (2006.01)

(52) U.S. Cl.
CPC ..... *H05B 33/0851* (2013.01); *H05B 33/0866* (2013.01); *H05B 37/029* (2013.01); *H05B 37/0227* (2013.01); *H05B 37/0245* (2013.01)

(58) Field of Classification Search
CPC  H05B 33/0854; H05B 37/02; H05B 37/0254; H05B 37/0281; H05B 37/034; G01N 2021/1793; G01V 8/20
See application file for complete search history.

(56) References Cited

U.S. PATENT DOCUMENTS

| | | | | |
|---|---|---|---|---|
| 6,990,394 | B2 * | 1/2006 | Pasternak | H04L 12/2602 455/3.01 |
| 7,697,925 | B1 | 4/2010 | Wilson et al. | |
| 8,729,833 | B2 * | 5/2014 | Chemel | H05B 33/0854 315/308 |
| 8,732,031 | B2 * | 5/2014 | Martin | G06Q 40/00 705/26.1 |
| 8,742,680 | B2 * | 6/2014 | Cowburn | H05B 37/02 315/132 |
| 8,742,694 | B2 * | 6/2014 | Bora | H05B 33/0863 315/113 |
| 8,922,570 | B2 * | 12/2014 | Archer | H05B 37/0245 345/204 |
| 9,307,621 | B1 * | 4/2016 | Parello | H05B 33/0845 |
| 9,398,669 | B2 * | 7/2016 | Aggarwal | H04L 12/2803 |
| 9,456,482 | B1 * | 9/2016 | Pope | H05B 33/0854 |
| 9,504,132 | B2 * | 11/2016 | Rose | H05B 37/0245 |
| 2007/0206375 | A1 | 9/2007 | Piepgras et al. | |
| 2011/0137757 | A1 | 6/2011 | Paolini et al. | |
| 2011/0252320 | A1 | 10/2011 | Arrasvuori et al. | |
| 2013/0278172 | A1 | 10/2013 | Maxik et al. | |

FOREIGN PATENT DOCUMENTS

| | | |
|---|---|---|
| WO | 2011007325 A1 | 1/2011 |
| WO | 2011033409 A1 | 3/2011 |
| WO | 2012112813 A2 | 8/2012 |
| WO | 2012148385 A1 | 11/2012 |
| WO | 2013186665 A2 | 12/2013 |

* cited by examiner

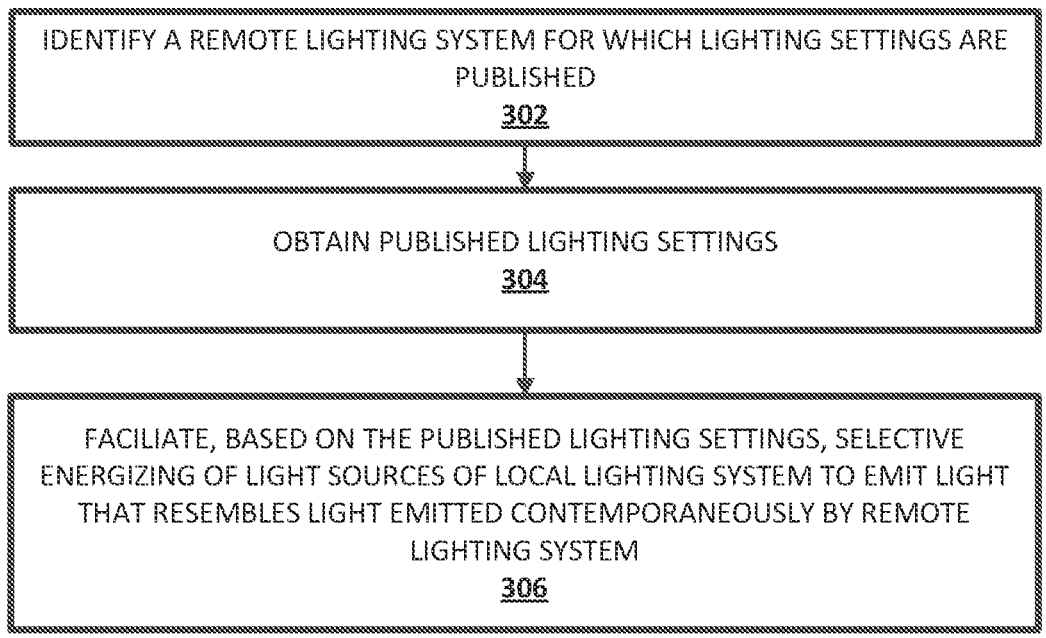
Fig. 3

SYSTEM FOR SHARING AND/OR SYNCHRONIZING ATTRIBUTES OF EMITTED LIGHT AMONG LIGHTING SYSTEMS

CROSS-REFERENCE TO PRIOR APPLICATIONS

This application is the U.S. National Phase application under 35 U.S.C. §371 of International Application No. PCT/IB2015/050049, filed on Jan. 4, 2015, which claims the benefit of U.S. Provisional Patent Application No. 61/924,748, filed on Jan. 8, 2014. These applications are hereby incorporated by reference herein.

TECHNICAL FIELD

The present invention is directed generally to lighting control. More particularly, various inventive methods and apparatus disclosed herein relate to sharing and/or synchronizing attributes of emitted light among lighting systems.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Network-connected lighting systems enable people to share lighting settings—e.g., one or more attributes of emitted light, such as hue/color, temperature, intensity, saturation, etc.—with friends or family. However, there are no simple or user friendly solutions to share lighting settings. Moreover, users may only be able to share static lighting settings. Users are not able to share lighting settings in real time, nor are users able to select with whom they share their lighting settings. Thus, there is a need in the art to provide users with more options and flexibility when sharing lighting settings.

SUMMARY

The present disclosure is directed to inventive methods and apparatus for lighting control. For example, one or more attributes of light emitted by one lighting system may be published, e.g., as a data feed. Other lighting systems may, based on the data feed, synchronize their emitted light with that emitted by the one lighting system, e.g., by selectively illuminating to emit light resembling light emitted by the one lighting system.

Generally, in one aspect, a computer-implemented method may include: identifying, by a device associated with a local user, a remote lighting system for which one or more attributes of light it emits are published in real time; obtaining, by the device, one or more published attributes of light emitted by the remote lighting system; and facilitating, by the device based on the one or more published attributes, selective energizing of one or more LEDs of a local lighting system to emit light that resembles light emitted contemporaneously by the remote lighting system.

In various embodiments, the method may include obtaining, by the device, a new published attribute of light emitted by the remote lighting system. In various versions, the method may include facilitating selective energizing of the one or more LEDs of the local lighting system, based on the new published attribute, to emit light that resembles light emitted contemporaneously by the remote lighting system.

In various embodiments, the one or more attributes of light emitted by the remote lighting system may be published on a social network. The method may include receiving, at a user interface of the device, an instruction to follow light emission activity of the remote lighting system. In various embodiments, the method may include publishing, by the device, light attribute sharing data. The light attribute sharing data may include a local attribute of light emitted or to be emitted imminently by the local lighting system and one or more identities of one or more remote users to be provided access to the uploaded data. In various versions, the light attribute sharing data may include: a first local attribute of light emitted or to be imminently emitted by a first set of light sources of the local lighting system that is accessible to a first remote user and inaccessible to a second remote user; and a second local attribute of light emitted or to be imminently emitted by a second set of light sources of the local lighting system that is different from the first set, wherein the second local attribute is accessible to the first and second remote users.

In various versions, the method may further include receiving, via a communication interface of the device from the local lighting system, raw data indicative of the local attribute of light emitted or to be emitted imminently by the local lighting system, and including the raw data in the light attribute sharing data. In various versions, the method may further include detecting, by a light sensor associated with the device, the local attribute of light emitted by the local lighting system, and including data indicative of the detected local attribute in the light attribute sharing data. In various versions, the method may include receiving, at a user interface associated with the device, a request to cause the local lighting system to emit light having the local attribute, and in parallel with causing the local lighting system to emit light having the requested local light attribute, including data indicative of the requested local light attribute in the light attribute sharing data.

In various embodiments, the remote lighting system is a first remote lighting system. The method may in such case include: identifying, by the device associated with the local user, a second remote lighting system for which one or more attributes of light it emits are published in real time; obtaining, by the device from, one or more published attributes of light emitted by the second remote lighting system; and facilitating, by the device based on attributes of light emitted by both the first and second remote lighting systems, selective energizing of one or more LEDs of a local lighting system to emit light that resembles light emitted contemporaneously by the first and second remote lighting systems. In various versions, the selective energizing includes assigning more weight to published attributes of light emitted by one of the first and second remote lighting systems than to published attributes of light emitted by the other.

In another aspect, an apparatus may include: one or more processors; a communication interface operably coupled with the one or more processors; and memory operably coupled with the one or more processors. The memory may contain instructions that, in response to execution of the instructions by the one or more processors, cause the one or more processors to: subscribe, via the communication interface, to a real time feed of data indicative of light emitted by a remote lighting system; and facilitate real time synchronization of one or more attributes of light emitted by a local lighting system with one or more attributes of light emitted by the remote lighting system based on the real time feed of data.

In various embodiments, the real time feed of data is associated with a user of a social network. In various versions, the memory further contains instructions that, in response to execution of the instructions by the one or more processors, cause the one or more processors to follow light emission updates by the social network user on the social network.

In another aspect, an apparatus may include: one or more processors; a communication interface operably coupled with the one or more processors; and memory operably coupled with the one or more processors. The memory may contain instructions that, in response to execution of the instructions by the one or more processors, cause the one or more processors to: upload, via the communication interface to a remote computing system, light attribute sharing data, wherein the light attribute sharing data includes a local attribute of light emitted or to be emitted imminently by a local lighting system and one or more identities of one or more remote users to be provided access to the uploaded data.

In various embodiments, the light attribute sharing data includes one or more push destination addresses for the light attribute sharing data. In various embodiments, the instructions, in response to execution of the instructions by the one or more processors, further cause the one or more processors to receive, via the communication interface from the local lighting system, raw data indicative of the local attribute of light emitted or to be emitted imminently by the local lighting system, and to include the raw data in the light attribute sharing data.

In various embodiments, the apparatus may include a light sensor operably coupled with the one or more processors. In some such embodiments, the instructions, in response to execution of the instructions by the one or more processors, further cause the one or more processors to detect, via the light sensor, the local attribute of light emitted by the local lighting system, and include data indicative of the detected local attribute in the light attribute sharing data.

In various embodiments, the apparatus may include a user interface. The instructions, in response to execution of the instructions by the one or more processors, may further cause the one or more processors to: cause the local lighting system to emit light having the attribute in response to receipt of a request at the user interface; and transmit, in parallel with the cause, via the communication interface, the light attribute sharing data to the remote computing system.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), etc.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1,500-2,000 degrees K.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The term "lighting settings" as used herein may refer to one or more attributes of light emitted by one or more light sources, such as light collectively emitted by a plurality of light sources of a lighting system. An "attribute of emitted light" (also referred to as a "light attribute" or a "lighting attribute") may refer to any selectable characteristic of light emitted by one or more light sources, including but not limited to hue, brightness, intensity, saturation, dynamic effects (e.g., flashing, pointing the light(s) in different directions, etc.), and so forth.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 3 and 4 depict example methods, in accordance with various embodiments.

DETAILED DESCRIPTION

Network-connected lighting systems enable people to share lighting settings—e.g., one or more attributes of emitted light, such as hue/color, temperature, intensity, saturation, etc.—with friends or family. However, there are no simple or user friendly solutions to share lighting settings. Moreover, users may only be able to share static lighting settings. Users are not able to share lighting settings in real time, nor are users able to select with whom they share their lighting settings. Thus, there is a need in the art to provide users with more options and flexibility when sharing lighting settings. In view of the foregoing, various embodiments and implementations of the present invention are directed to sharing attributes of emitted light across lighting systems in real time and/or with selected users.

Figure 1:
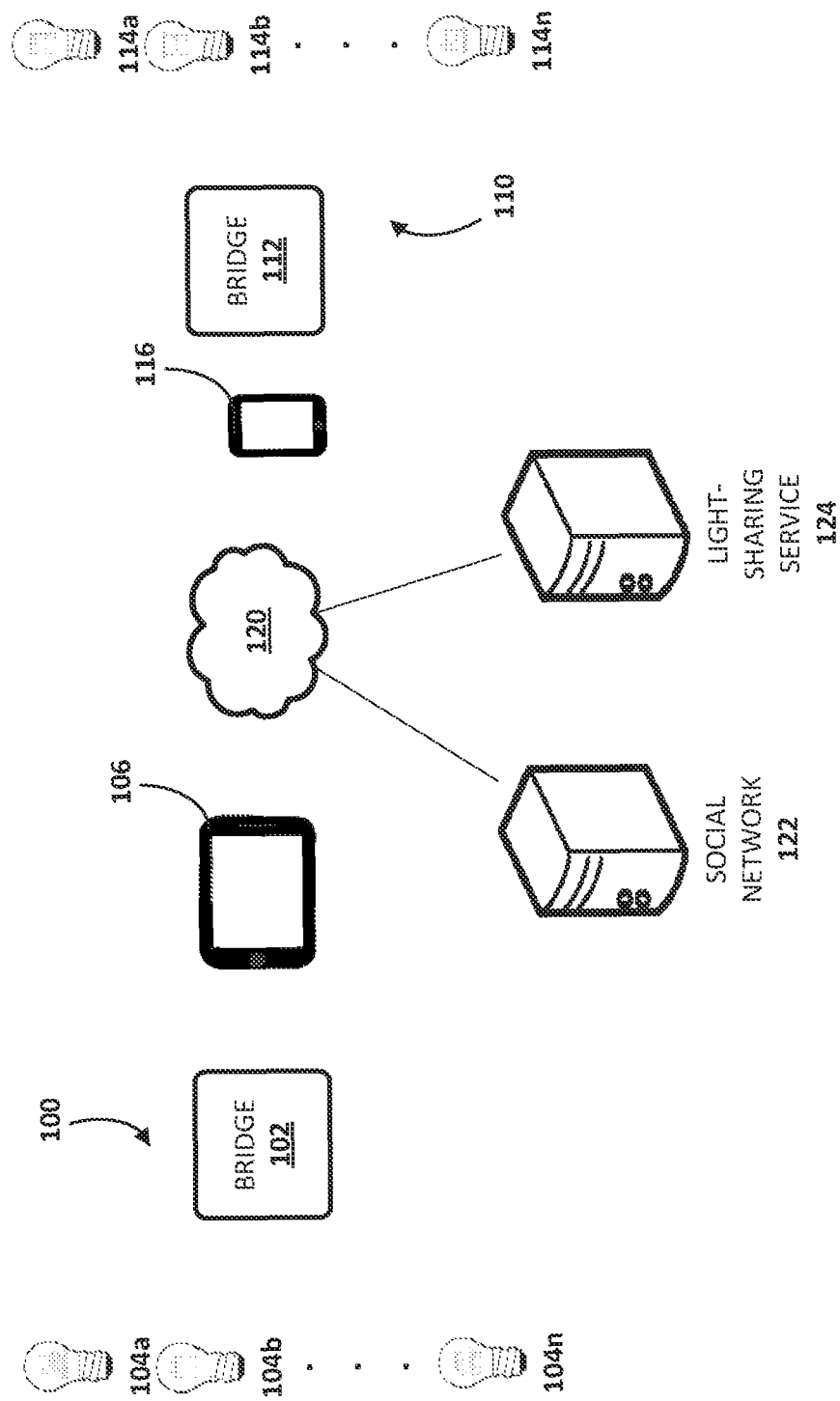
FIG. 1 schematically illustrates example components that may cooperate to facilitate sharing of light attributes across lighting systems, in accordance with various embodiments.

Referring to FIG. 1, in one embodiment, a first, "local" lighting system 100 may include a local bridge 102 and a plurality of light sources, depicted in FIG. 1 as a plurality of LEDs 104a-n. Local bridge 102 may be a computing device or computing system that is configured to communicate with and facilitate control of plurality of LEDs 104a-n. Local bridge 102 may communicate with plurality of LEDs 104a-n using a variety of wired or wireless technologies, including but not limited to WiFi, Bluetooth, ZigBee, RFID, NFC, Ethernet, coded light (e.g., emitted light that carries modulated information) and so forth.

In various embodiments, a user (not depicted) may operate local bridge 102 to selectively energize one or more of the plurality of LEDs 104a-n. For instance, in FIG. 1, a tablet computer 106 may be in communication with local bridge 102, e.g., using WiFi, Bluetooth, ZigBee, etc., and may provide a user interface (e.g., on a touch screen display) that a user may operate to control one or more attributes of light emitted by lighting system 100. While a tablet computer is shown in FIG. 1, this is not meant to be limiting. It should be understood that any networked device, including but not limited to smart phones, laptop computers, stand-alone devices, wearable devices, wall-mounted devices, and so forth, may be used to communicate with local bridge 102 to control lighting system 100. Attributes of light emitted by plurality of LEDs 104a-n may be controlled directly (e.g., by changing the color or brightness of light emitted by a particular LED), or indirectly through various optical elements such as lenses, collimators, and so forth.

A remote lighting system 110 may include similar components as local lighting system 100. For instance, in FIG. 1, remote lighting system 110 includes a remote bridge 112 and a plurality of light sources that once again are depicted as a plurality of LEDs 114a-n. A computing device in the form of a smart phone 116 is depicted as being usable to communicate with remote bridge 112 to control remote lighting system 110. It should be understood that lighting systems as described herein may have other types of light sources, such as incandescent. Moreover, the "local" and "remote" lighting systems 100 and 110, respectively, are so-named from the perspective of a user associated with local lighting system 100. If embodiments were described instead from the perspective of a user associated with remote lighting system 110, then obviously these terms would be reversed.

Local lighting system 100 and remote lighting system 110, as well as tablet computer 106 and smart phone 116, may be able to communicate with each other and other components via one or more computing networks 120. One or more computing networks 120 may include one or more local area and wide area networks, including the Internet.

In various embodiments, a social network 122 computing system may be connected to one or more computing networks 120, and may include one or more computers configured to implement a social network. As will be described herein, in various embodiments, social network 122 may be used by social network users to share lighting settings amongst themselves, e.g., in real time.

Additionally or alternatively, in various embodiments, a light-sharing service computing system 124 may also be connected to one or more computing networks 120, and may be configured to facilitate real time sharing of lighting settings among multiple lighting systems such as local lighting system 100 and remote lighting system 110. In some embodiments, light-sharing service 124 may provide a dedicated light-sharing portal that users may log into, e.g., using devices such as tablet computer 106 or smart phone 116, to cause their own light settings to be published in real time and/or to follow other user's lighting settings in real time.

Figure 2:
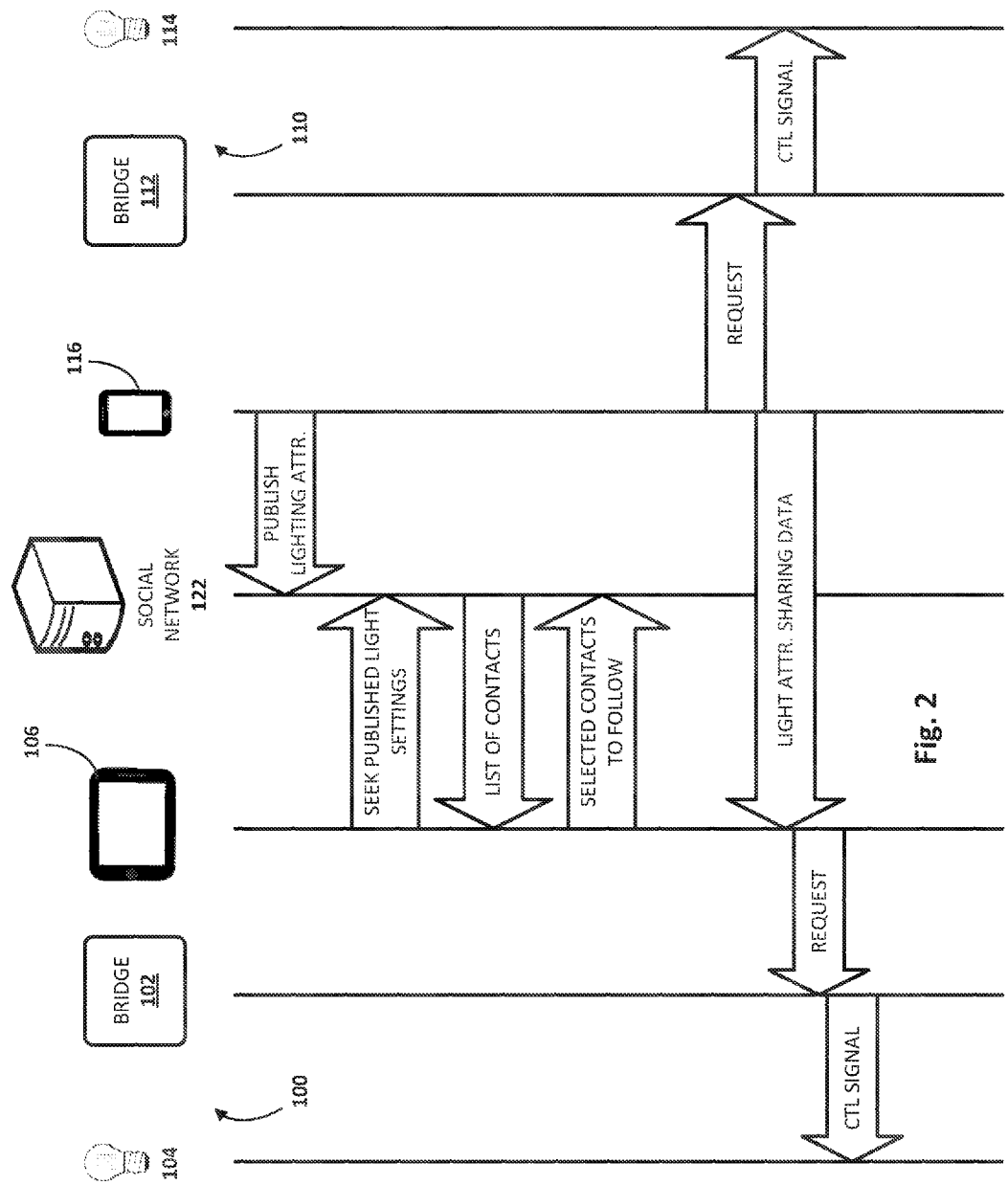
FIG. 2 depicts example communications that may occur between various components of FIG. 1, in accordance with various embodiments.

FIG. 2 depicts example communications that may occur between various components of FIG. 1, in accordance with various embodiments. Time runs down the page, but is not represented to scale, which means various amounts of time may pass between various communications.

The first communication in FIG. 2 is from smart phone 116 to social network 122, in which smart phone 116 requests that lighting settings of one or more LEDs 114 be published as a data feed, e.g., as a social network status update or a blog entry. In some embodiments, the user may be able to select which social network contacts or other users will have access to her published lighting settings, at various levels of granularity. For example, a user may specify that family members should have access to all lights in her house, whereas acquaintances are only provided access to particular lights (e.g., in a particular room, outside, etc.).

For example, assume the first user wishes to publish lighting settings of remote his lighting system 110 (local to him, remote from the perspective of lighting system 100) on a social network. The first user may operate smart phone 116 to drag an icon representing a lighting device, a group of lighting devices (e.g., two or more of LEDs 114), or a lighting scene or program, onto a graphical representation of a particular social network. In some embodiments, this may cause an additional menu to pop up that enables the first user to define how exactly the changes in light emitted by her own lighting system should be reflected in the social network, e.g., whether a textual representation of the color is posted, or whether the color of her lighting system is associated with a preset or user-defined social networking mood.

Referring back to FIG. 2, sometime later, tablet computer 106 may send a communication to social network 122 seeking published light settings. Social network 122 may reply with a list of the user's social network contacts (sometimes referred to as "friends", "followers", "contacts" or "connections"), which may then be rendered by tablet computer 106, e.g., on a touch screen display. In some embodiments, social network 122 (or tablet computer 106) may filter these social network contacts to those that are actively sharing lighting settings. In other embodiments, the social network application on tablet computer 106 may receive all the user's social network contacts, and may render those social network contacts sharing lighting settings to be visually emphasized over contacts that do not share lighting settings, e.g., with a special symbol or font. The user may then operate the social networking application to provide to social network 122 a selection of one or more light setting-sharing contacts who the user would like to follow.

Assume a first user wishes to have her first lighting system follow a second lighting system of a second user. The first user may operate tablet computer 106 to drag an icon representing her local lighting system 100 onto a social network graphical icon associated with the second user. In some embodiments, this may cause an additional menu to pop up that enables the first user to define how exactly the changes in light emitted by the second lighting system should be reflected, e.g., in the first user's own lighting system or on the first user's social network application. For instance, a the first user may be given the ability to configure which lighting devices of the first user's own lighting system should react to changes in light emitted by the second lighting system. The user may indicate that only one specific connected lamp follows those changes, or all set of lighting device in a particular room or area to follow those changes.

Sometime later, a user may operate smart phone 116 to transmit a request to remote bridge 112 to alter one or more attributes of light emitted by LEDs 114. Remote bridge 112 may in turn generate and transmit to one or more remote LEDs 114 one or more control signals to cause LEDs 114 to emit light having the requested attributes. In parallel, smart phone 116 (e.g., via an installed smart phone application) may upload light attribute sharing data to tablet computer 106, e.g., through social network 122. In various embodiments, light attribute sharing data may include one or more local attributes of light emitted or to be emitted imminently by remote lighting system 110, as well as one or more identities of one or more remote users to be provided access to the uploaded data. In some embodiments, the light attribute sharing data may include one or more push destination addresses for the light attribute sharing data.

In some embodiments, a user may be able to selectively publish attributes emitted by her local lighting system. For example, the user may select some remote users (e.g., close friends, families as indicated on a social network) that should have access to and/or receive attributes emitted by some light sources of a lighting system, and other remote users (e.g., casual acquaintances) that should have access to and/or receive attributes emitted by other light sources of the lighting system. For instance, the light attribute sharing data may include a first local attribute of light emitted or to be imminently emitted by a first set of light sources of the local lighting system that is accessible to a first remote user and inaccessible to a second remote user, and a second local attribute of light emitted or to be imminently emitted by a second set of light sources of the local lighting system that is different from the first set, wherein the second local attribute is accessible to the first and second remote users. In this manner, a user may ensure light emitted by light sources she considers private or intimate is shared only with those she trusts.

As another example, in some embodiments, a user may be able to select some remote users (e.g., close friends, families as indicated on a social network) that should have access to and/or receive attributes emitted by a lighting system after a first delay (e.g., immediately). The user may be able to select other remote users (e.g., casual acquaintances, untrusted friends) that should have access to and/or receive attributes emitted by the lighting system after some predetermined or random delay.

The attributes of light emitted or to be emitted imminently by remote lighting system 110 may be provided by smart phone 116 in FIG. 2 as raw data representing the user-selected attributes of light emitted or to be emitted imminently by remote lighting system 110, and may be provided in parallel with implementation of those attributes on remote lighting system 110. However, this is not meant to be limiting. In other embodiments, smart phone 116 and/or remote bridge 112 may include a light sensor configured to detect the attribute of light emitted by remote lighting system 110, for inclusion in the light attribute sharing data. Additionally or alternatively, remote bridge 112 may transmit raw data corresponding to actually lighting settings to smart phone 116, e.g., for inclusion in the light attribute sharing data.

After the light attribute sharing data is uploaded to social network 122, it may be provided (e.g., pushed) to tablet computer 106. For example, if a social network application is actively executing on tablet computer 106, the light attribute sharing data may be immediately pushed to tablet computer 106 after it is received at social network 122. However, in some embodiments, if the user of tablet computer 106 is not actively using the social network application, then that may indicate that the user does not wish to "follow" light settings of remote lighting system 110 at this time.

Assuming tablet computer 106 is actively executing a smart phone application, tablet computer 106 may then facilitate selective energizing of one or more LEDs 104 of local lighting system 100 to emit light that resembles light emitted contemporaneously by remote lighting system 110. For instance, tablet computer 106 may transmit, e.g., to local bridge 102, a request to cause one or more LEDs 104 to emit light that resembles light emitted contemporaneously by remote lighting system 110. Local bridge 102 may in turn generate and provide one or more suitable control signals to local LEDs 104.

In all likelihood, two lighting systems that share lighting settings are not going to be configured exactly the same. For example, one lighting system may have more or less light sources than the other, or light sources with more or less capabilities (e.g., LEDs have more capabilities than, say, incandescent bulbs). Thus, for a first lighting system to emit light that "resembles" light emitted by a second lighting system may mean that the first lighting system makes a best effort to emulate, imitate or mimic light emitted by the second.

A first lighting system may include multiple light sources that each create light with a particular property (e.g. color), whereas a second lighting system may include fewer light sources or even has a single light source that is configured to create multiple lighting effects (e.g. colors). For instance, assume the first lighting system has LEDs capable of emitting red and yellow light, but not orange light. Assume that the second lighting system has LEDs that are emitting orange light. The first lighting system cannot directly imitate the second lighting system because the first lighting system cannot emit orange light; however, it can emit red and yellow light simultaneously to approximate orange light.

In some embodiments, in order to achieve similarity in the created lighting effect, the first lighting system may share spatial information about various partial light effects lighting which together result in the total light effect. For example, the first lighting system may share that it includes blue-colored up-lighting and white colored down-lighting. This information may be captured by the lighting system itself (e.g., via bridge 102 or 112), or by one or more light sensors configured to monitor light emitted by the lighting system.

As used herein, "real time" does not necessarily refer to "immediately," though it may. Rather, "real time" refers more broadly to synchronization between lighting systems. For example, "real time" may be used to refer to how lighting settings of a first lighting system may be provided to a second lighting system in response to a change in light emitted by the first lighting system. Additionally, "real time" may refer to the second lighting system responding by emitting light that resembles light contemporaneously (e.g., during the same time period, at least partially concurrently) by the first lighting system. "Real time" may also refer to attempted synchronization between lighting systems, even if in actuality the lighting systems are not precisely in synch (e.g., there may be some delay between one lighting system synching its light output to the other's). Thus, "real time" may include at least some delay.

For instance, even if a remote user changes her lighting settings and those are published, a local user who follows that remote user's lighting settings may not necessarily obtain those remote lighting settings immediately. The remote lighting settings may not be pushed to the local user's tablet computer 106 until the local user actually logs into a social network (in this way, following someone else's lighting settings becomes personal to a particular user). Or, the local user may be away from local lighting system 100 when the remote lighting system's light is changed. In such case, tablet computer 106 may not attempt to obtain the remote lighting settings until the user returns home, at which point the remote user may have changed her lighting settings again in the meantime.

In some cases, a user may wish to delay publication of her local light settings. For example, she may wish to delay publishing the fact that all of her lights are out to avoid notifying potential intruders that she is away from home. In such case, she may operate her local computing device (e.g., tablet 106 or smart phone 116) cause light attribute sharing data associated with her lighting system to be published only after some preset (or random) delay.

FIG. 3 depicts an example method 300 that may be implemented, e.g., by tablet computer 106 or smart phone 116, in accordance with various embodiments. At block 302, a remote lighting system for which lighting settings are published may be identified. For example, a user operating a social networking application on tablet computer 106 may peruse a list of her friends and identify one who shares attributes of light emitted by a lighting system under his control.

At block 304, one or more published lighting settings of the lighting system identified at block 302 may be obtained. For instance, the user may operate the social networking application to "follow" lighting settings of the remote lighting system under her friend's control, so that whenever her friend alters his lighting settings, the local user may receive (e.g., be pushed) an update.

At block 306, selective energizing of light sources of the local lighting system (e.g., LEDs 104 of local lighting system 100) to emit light that resembles light emitted by the remote lighting system (e.g., remote lighting system 110) may be facilitated, e.g., based on the published lighting settings obtained at block 304. For instance, if the user's friend changes his lighting system to emit soft lighting, e.g., for a romantic setting, then tablet computer 106 may send a request to local bridge 102 that local lighting system 100 emulate this romantic lighting.

Figure 4:
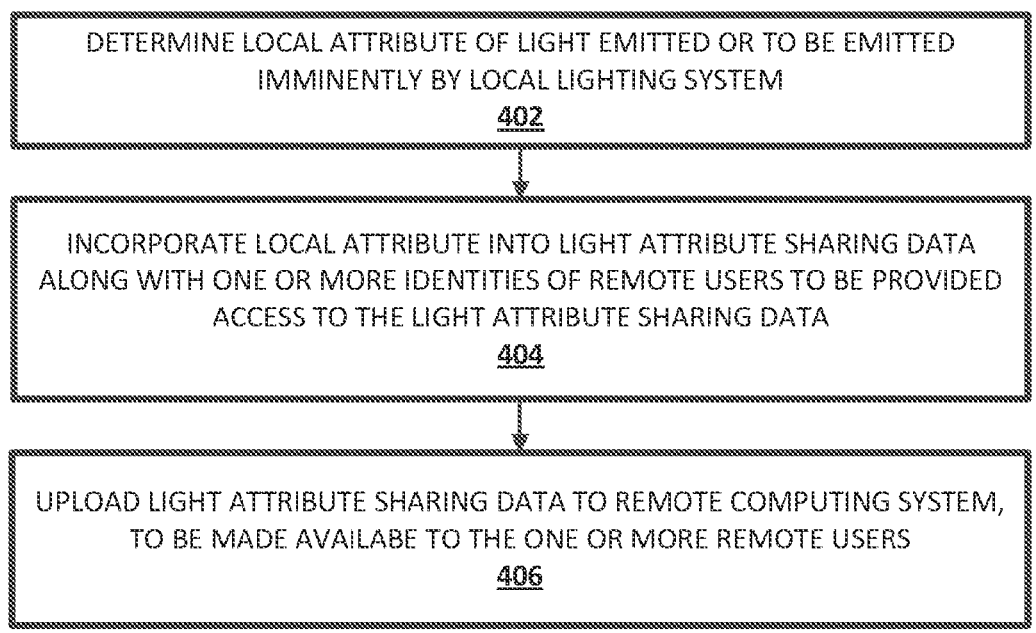

FIG. 4 depicts another example method 400 that may be implemented, e.g., by tablet computer 106 or smart phone 116, in accordance with various embodiments. At block 402, a local attribute of light emitted or to be emitted imminently by a local lighting system (e.g., 100) may be determined. For example, a user's request at tablet computer 106 to alter lighting settings of local lighting system 100 may be intercepted to determine a desired local lighting attribute. Or, a light sensor on tablet computer 106 may detect the local light setting. At block 404, the one or more determined local attributes may be incorporated into light attribute sharing data, e.g., along with one or more identities of remote users (e.g., social network contacts) to be provided access to the light attribute sharing data. At block 406, the light attribute sharing data may be uploaded to a remote computing system to which other devices usable to control other lighting systems have access. For instance, a social networking application on tablet computer 106 may upload light settings of light emitted by local lighting system 100 to social network 122, so that they will be posted on a user's social network page.

Although examples described herein have referred generally to lighting settings being exchanged over social networks, this is not meant to be limiting. Referring back to FIG. 1, a light sharing service 124 unaffiliated with any social network may be another avenue for lighting systems to share lighting settings. For instance, instead of sharing lighting settings through tablet computer 106 and smart phone 116, in various embodiments, bridges 102 and 112 may be configured to communicate with light sharing service 124, e.g., over one or more computing networks 120. A user may instruct local bridge 102, e.g., using tablet computer 106, to "follow" lighting settings of remote lighting system 110. When remote lighting system 110 has its lighting settings changed, remote bridge 112 may automatically notify light sharing service 124. Assuming local bridge is "following" remote lighting system 110, local bridge 102 may detect this change and may cause one or more LEDs 104 to emit light that resembles light emitted contemporaneously by remote lighting system 110. In some such embodiments, a user may define a unique identifier for a group of light sources (e.g., LEDs 104a-n, 114a-n) under the control of a particular bridge, such as local bridge 102 or remote bridge 112. The local bridge 102 may send that identifier, along with a network address of local bridge 102 (e.g., IP address), to light sharing service 124. Users of light sharing service 124 may be able to exchange unique identifiers in order to follow each other's lighting system schemes. In this manner, users may even cause different lamps in their own households to follow lighting settings of a particular lighting system in their own household.

In other embodiments, lighting systems may exchange lighting settings more directly. For example, local bridge 102 and remote bridge 112 may be configured to communicate with each other directly, e.g., over one or more computing networks 120. A user may instruct local bridge 102, e.g., using tablet computer 106, to "follow" lighting settings of remote lighting system 110. Assuming local bridge 102 is "following" remote lighting system 110, when remote lighting system 110 has its lighting settings changed, remote bridge 112 may automatically notify local bridge 102. In response, local bridge 102 may cause one or more LEDs 104 to emit light that resembles light emitted contemporaneously by remote lighting system 110.

In some embodiments, a user may configure her local light system so that during particular forms of direct communication with particular remote parties or locations, her local lighting system automatically begins to follow a remote lighting system. For example, assume parties located in a location illuminated by local lighting system 100 wish to hold a video conference with parties located in a location illuminated by remote lighting system 110. When a conference call is initiated between the two locations, the respective bridges may also communicate to share lighting settings. In some embodiments, a user at one lighting system may press an "add lighting scene" button to cause that lighting system to emit light having one or more attributes of light emitted contemporaneously by the other lighting system. Lighting settings may be exchanged in various ways, such as via social network 122 or light sharing service 124. In some embodiments, lighting settings may be encoded in a metadata stream included in the video or audio signal.

Lighting settings of the two or more lighting systems involved with the video conference may be blended, merged, mixed, or otherwise interacted in various ways. As an example, if light emitted by local lighting system 100 is relatively dark and light emitted by remote lighting system 110 is relatively bright, local lighting system 100 may brighten its emitted light, or remote lighting system 110 may dim its light, so that both have attributes that are similar to the other. Or, the two lighting systems may both adjust light they emit to meet somewhere in the middle. As another example, assume that it is nighttime at one location but daytime at the other. The lighting system in the nighttime location may adjust light it emits to resemble light emitted by the daytime lighting system, so that parties at both locations are not distracted by or preoccupied with the time difference between the two locations. In various embodiments, one or both lighting systems may be controllable locally, and the other may automatically adjust to any changes. In some embodiments, at the conclusion of the video conference, the lighting systems may revert to their original lighting settings.

As another example, assume a user of local lighting system 110 is using tablet computer 106 to instant message or chat with a friend at remote lighting system 110. The user may configure tablet computer 106 so that when more than x messages are exchanged (or another criterion is met), lighting settings of local lighting system 100 are published, e.g., by tablet computer 106. Likewise, smart phone 116 may be configured to transition remote lighting system 110 to emit light that resembles that emitted by local lighting system 100, once lighting information of local lighting system 100 is published. Similar to the conference call example described above, it is also possible to change the lighting scene at both ends, such that an "average" light scene is created. This can happen automatically (e.g., as result of a user-defined setting) or on explicit request, e.g. by clicking a follow light scene button, or by typing a specific "light scene" emoticon. Similar functionality can be offered while users play a video game together over a distance.

In some embodiments, computing devices such as tablet computer 106, smart phone 116, or another portable computing device such as a wearable computing device may be configured to sense current lighting conditions (whether created by a lighting system or by other means, such as natural light) and publish information about those sensed lighting conditions, e.g. on social network 122. For instance, a user may configure her smart watch or smart glasses to detect ambient light at the user's location and publish (e.g., "post") information about that light to her social network profile. Her social network contacts may "follow" these updates in real time, and may configure their lighting systems to emit light that resembles light sensed by the user at any given point in time. Thus, if the user's hike in the woods begins in the sun but then turns rainy, social network contacts following the user's lighting conditions may see their own lighting systems attempt to synch with the user's sensed lighting conditions, e.g., by emitting light that resembles sun first, then rain.

A particular user may configure her lighting system to follow multiple remote lighting systems at once. In such case, the user's own lighting system may selectively energize its light sources based on a combination of light emitted by these multiple remote lighting systems. For instance, in some embodiments, the user's lighting system may assign a "social distance" to remote lighting systems. Lighting settings of a remote lighting system associated with a very close social network contact (e.g., family) may be weighted more heavily than lighting settings of a remote lighting system associated with a mere acquaintance, and thus may influence the user's own lighting system more heavily. A user further may "reject" lighting settings of remote lighting systems associated with certain contacts, which may increase social distance and cause those contacts' lighting systems to be weighted less heavily in the future. Additionally or alternatively, a geographic distance between lighting systems may be used to determine how much weight to assign to their respective lighting settings.

Figure 5:
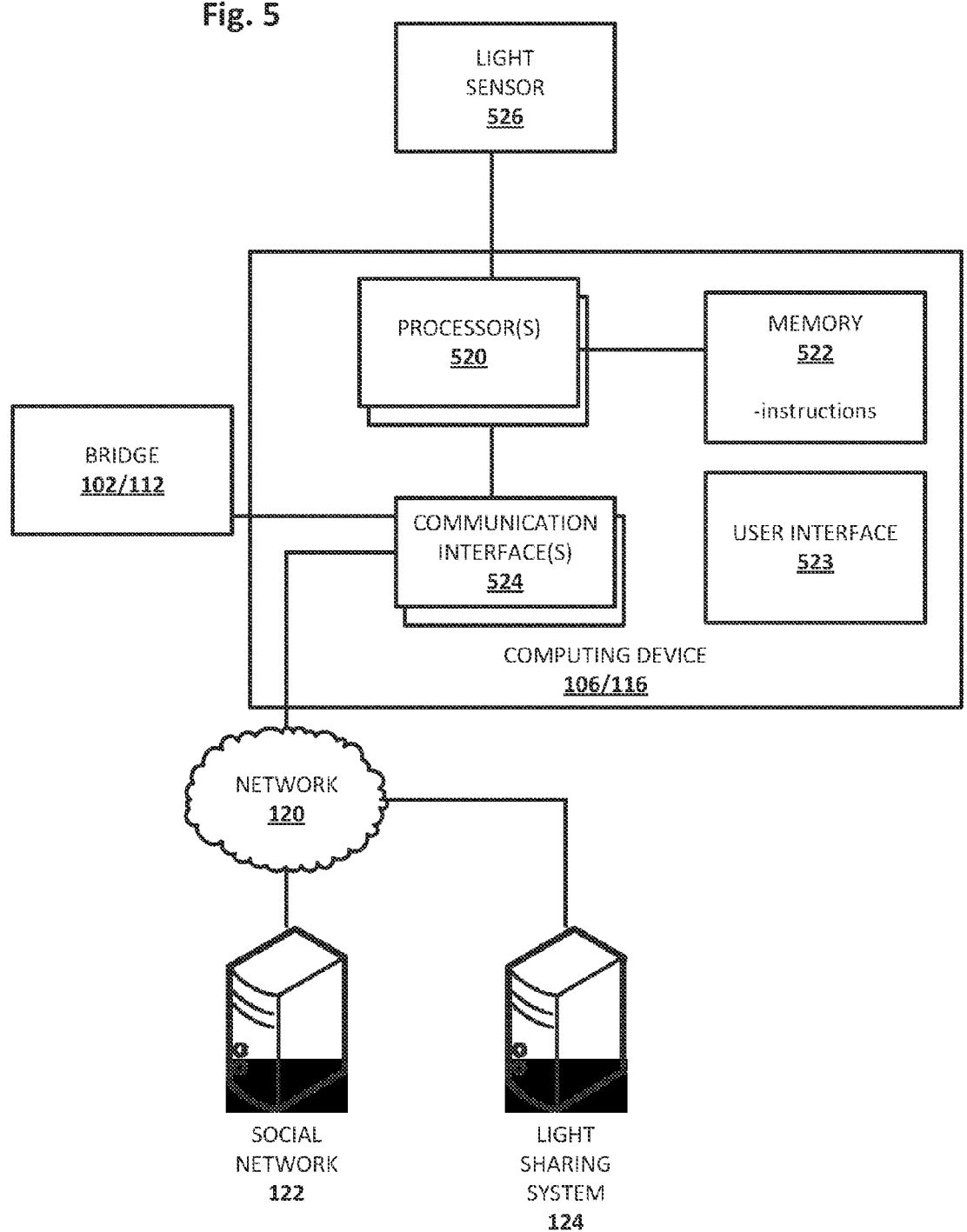
FIG. 5 schematically depicts components of an example computing device, in accordance with various embodiments.

FIG. 5 depicts example components that may be deployed in a computing device such as tablet computer 106, smart phone 116, or other similar devices. One or more processors 520 may be operably coupled with memory 522, a user interface 523 (e.g., buttons, knobs, touch screen, etc.), and one or more communication interfaces 524. One or more processors may take the form of various microprocessors and/or application-specific integrated circuits (ASICs). Memory 522 may store instructions configured to cause one or more processors 520 to perform selected aspects of various techniques described herein, including methods 300 and 400. Memory 522 may take various forms, including disk-based, solid state (e.g., flash, RAM), and so forth. Communication interfaces 524 may include but are not limited to interfaces configured to utilize WiFi, Bluetooth, NFC, RFID, coded light, ZigBee, Ethernet, and so forth. As noted above, one or more processors 520 may be configured to communicate with a social network 122 or a light sharing system 124 over one or more computing networks 120 via one or more communication interfaces 524. Similarly, one or more processors 520 may be in communication with one or more bridges 102/112 via one or more communication interfaces 524. A light sensor 526 may also be operably coupled with one or more processors 520. Light sensor 526 may be implemented in various ways, including but not limited to with a photoresistor, a camera, and so forth.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Reference numerals appearing between parentheses in the claims, if any, are provided merely for convenience and should not be construed as limiting the claims in any way.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A computer-implemented method, comprising:
   identifying, by a device associated with a local user, a remote lighting system for which one or more attributes of light it emits are published in real time;
   obtaining, by the device, one or more published attributes of light emitted by the remote lighting system; and
   facilitating, in real time, by the device based on the one or more published attributes, selective energizing of one or more LEDs of a local lighting system to emit light that resembles light emitted contemporaneously by the remote lighting system,
   wherein the one or more attributes of light emitted by the remote lighting system are published on a social network, and the method further comprises receiving, at a user interface of the device, an instruction to follow light emission activity of the remote lighting system.

2. The computer-implemented method of claim 1, further comprising obtaining, by the device, a new published attribute of light emitted by the remote lighting system.

3. The computer-implemented method of claim 2, further comprising facilitating selective energizing of the one or more LEDs of the local lighting system, based on the new published attribute, to emit light that resembles light emitted contemporaneously by the remote lighting system.

4. The computer-implemented method of claim 1, the method further comprises publishing, by the device, light attribute sharing data, wherein the light attribute sharing data includes a local attribute of light emitted or to be emitted imminently by the local lighting system and one or more identities of one or more remote users to be provided access to the uploaded data.

5. The computer-implemented method of claim 4, wherein the light attribute sharing data includes:
    a first local attribute of light emitted or to be imminently emitted by a first set of light sources of the local lighting system that is accessible to a first remote user and inaccessible to a second remote user; and
    a second local attribute of light emitted or to be imminently emitted by a second set of light sources of the local lighting system that is different from the first set, wherein the second local attribute is accessible to the first and second remote users.

6. The computer-implemented method of claim 4, further comprising receiving, via a communication interface of the device from the local lighting system, raw data indicative of the local attribute of light emitted or to be emitted imminently by the local lighting system, and including the raw data in the light attribute sharing data.

7. The computer-implemented method of claim 4, further comprising detecting, by a light sensor associated with the device, the local attribute of light emitted by the local lighting system, and including data indicative of the detected local attribute in the light attribute sharing data.

8. The computer-implemented method of claim 4, further comprising receiving, at a user interface associated with the device, a request to cause the local lighting system to emit light having the local attribute, and in parallel with causing the local lighting system to emit light having the requested local light attribute, including data indicative of the requested local light attribute in the light attribute sharing data.

9. The computer-implemented method of claim 1, wherein the remote lighting system is a first remote lighting system, the method further comprising:
    identifying, by the device associated with the local user, a second remote lighting system for which one or more attributes of light it emits are published in real time;
    obtaining, by the device from, one or more published attributes of light emitted by the second remote lighting system; and
    facilitating, by the device based on attributes of light emitted by both the first and second remote lighting systems, selective energizing of one or more LEDs of a local lighting system to emit light that resembles light emitted contemporaneously by the first and second remote lighting systems.

10. The computer-implemented method of claim 9, wherein the selective energizing includes assigning more weight to published attributes of light emitted by one of the first and second remote lighting systems than to published attributes of light emitted by the other.

11. A non-transitory computer-accessible storage medium comprising instructions that, in response to execution of the instructions by a computing device, cause the computing device to perform the method of claim 1.

12. An apparatus, comprising:
    one or more processors;
    a communication interface operably coupled with the one or more processors; and
    memory operably coupled with the one or more processors and containing instructions that, in response to execution of the instructions by the one or more processors, cause the one or more processors to:
    subscribe, via the communication interface, to a real time feed of data indicative of light emitted by a remote lighting system, wherein the real time feed of data is associated with a user of a social network; and
    facilitate real time synchronization of one or more attributes of light emitted by a local lighting system with one or more attributes of light emitted by the remote lighting system based on the real time feed of data.

* * * * *